Figure 1:
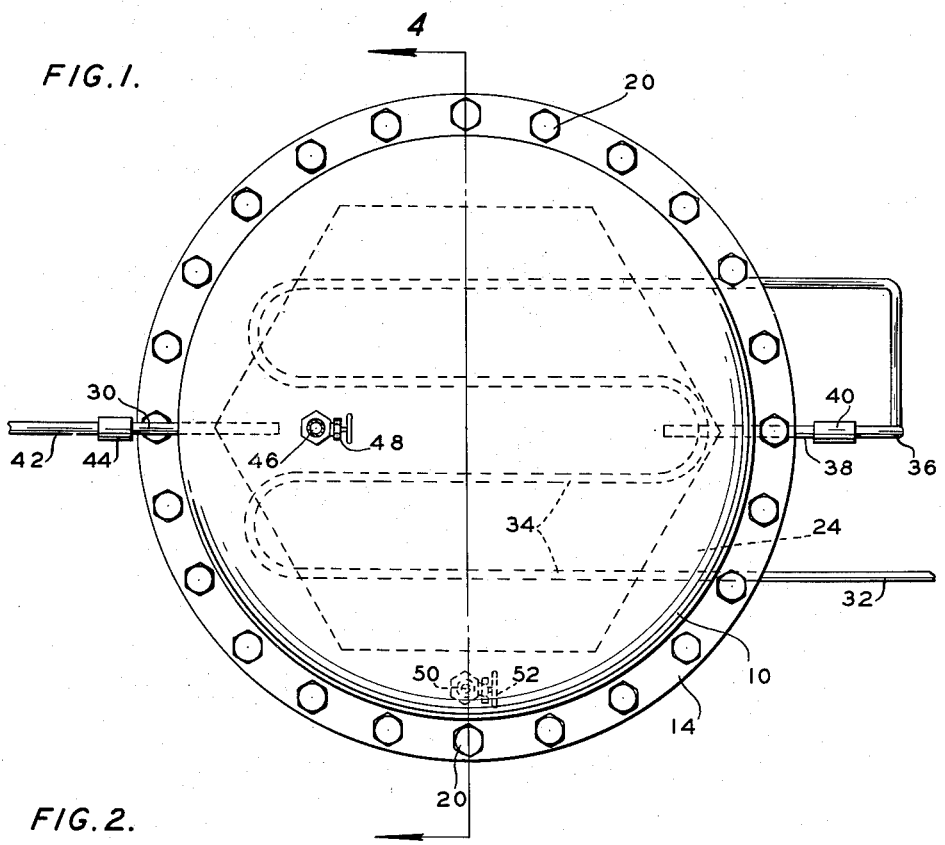

April 3, 1956  G. C. EARLEY  2,740,762
REACTIVATION OF PLATINUM GROUP METALS CONTAMINATED
WITH IRON CONTAINING MATERIAL
Filed April 21, 1952  2 Sheets-Sheet 1

INVENTOR.
GEORGE C. EARLEY
BY
Hudson + Young
ATTORNEYS

April 3, 1956 G. C. EARLEY 2,740,762
REACTIVATION OF PLATINUM GROUP METALS CONTAMINATED
WITH IRON CONTAINING MATERIAL
Filed April 21, 1952 2 Sheets-Sheet 2

INVENTOR.
GEORGE C. EARLEY
BY
*Hudson + Young*
ATTORNEYS

United States Patent Office 2,740,762
Patented Apr. 3, 1956

2,740,762

REACTIVATION OF PLATINUM GROUP METALS CONTAMINATED WITH IRON CONTAINING MATERIAL

George C. Earley, Dumas, Tex., assignor to Phillips Petroleum Company, a corporation of Delaware Application April 21, 1952, Serial No. 283,387

11 Claims. (Cl. 252—413)

This invention relates to the treatment of noble metal catalysts. In some of its aspects the invention pertains to the purification of platinum group metal catalysts which have undergone loss in activity during use.

Noble metal catalysts, and particularly those containing metals of the platinum group viz. platinum, iridium, osmium, palladium, rhodium and ruthenium, are employed in various chemical reactions. Catalysts comprising one or more of said metals are used in the form of the metal supported on conventional catalyst supports such as silica or alumina in granular form, supported on fibers such as asbestos or glass fibers, or in the unsupported form as woven wire gauzes, plates, spirals and the like. Among the chemical reactions so catalyzed, the oxidations are particularly noted, and especially the oxidation of ammonia with oxygen, air or other oxygen-containing gases to form nitrogen oxides which are in turn converted to nitric acid by reaction with water. The oxidation of sulfur dioxide to convert same to sulfur trioxide which is then converted by reaction with water into sulfuric acid is also often catalyzed by noble metals. Precious metal catalysts have also been used in the manufacture of hydrogen cyanide by the high temperature reaction of ammonia, hydrocarbons, e. g. methane and oxygen.

For the oxidation of ammonia, the catalyst is usually in the form of gauze, but may also consist of perforated plates, strips or other suitable structures. The catalyst metal of which the structure is formed comprises a precious metal, usually platinum or an alloy thereof with another precious metal usually a metal of the platinum group, e. g. an alloy of platinum and rhodium or of platinum and iridium, and may also contain non-precious metals or materials. A catalyst often used at the present time in ammonia oxidation plants is a gauze woven from wire made from platinum containing from 2 to 50 per cent rhodium usually about 10 per cent rhodium. A typical installation contains in each reactor a gauze woven from wire 0.003 inch in diameter, having 80 meshes per inch, and consisting of four layers of gauze as close together as possible. These gauzes are bound together at their peripheries and the gaseous mixture of ammonia and air is passed therethrough at a temperature of from 850 to 950° C.

It is standard practice to subject new platinum gauzes before use to pickling with HCl and/or HCOOH or with $HNO_3$ followed by HCOOH. This pickling is repeated in most ammonia oxidation plants about every fourteen days in order to maintain the activity of the catalyst at a high level.

I have found that catalysts of the type described hereinbefore often undergo an apparently permanent loss in activity. This loss in activity may be gradually incurred, or sometimes appears over a short period of time. I have particularly noticed that this phenomenon occurs immediately after a power failure, at which time apparently the catalyst gauze becomes contaminated with a magnetic black dust which penetrates several layers of the gauze. Pickling the gauze in acid according to the conventional procedure fails to remove this material and restore the activity. This contaminant is thought to be largely magnetic iron oxide strongly ignited during the ammonia oxidation. X-ray analysis of a gauze some time after its removal from the reactor indicated the presence of gamma $Fe_2O_3$. It is thought probable that corrosion of iron and steel equipment and piping occurs upstream of the platinum catalyst and that as a result of this corrosion iron oxide is picked up in the flowing gas and deposits on the catalyst surface. However, the foregoing statements are taken to be merely my present ideas as to the probable reasons for the more or less permanent deactivation of catalyst which the present invention is intended to overcome, and I do not wish to be bound by any particular theories of what the contaminant is or why the contamination occurs or why my invention is successful in restoring the catalyst activity.

An object of this invention is to impove the activity of a noble metal catalyst which has undergone loss in activity during use. Another object of the invention is to provide a treatment for platinum gauze catalyst which will restore activity to same when such activity is lost in a manner preventing desired restoration of activity by conventional acid pickling.

A further object is to increase the useful life of a platinum gauze catalyst. Yet another object is to purify a platinum-group metal catalyst which has become contaminated during use in high temperature oxidation. Other objects and advantages of the invention will be apparent to one skilled in the art from the accompanying disclosure and discussion.

In accordance with preferred aspects of my invention one or more of the foregoing objects are attained by subjecting catalysts of the type described to treatment at high temperature with a reducing gas, followed by treatment with an aqueous acid. In a preferred embodiment, a gauze catalyst consisting essentially of one or more platinum group metals, which has been employed in the oxidation of ammonia and which has become contaminated as described, is treated with a reducing gas selected from the group consisting of hydrogen, ammonia and carbon monoxide at a temperature of at least 750° C. for at least one hour. The catalyst is then cooled, and then subjected to the action of an aqueous strong mineral acid. This acid treatment is preferably effected at the boiling point of the aqueous acid, but can be done at room temperature or higher temperatures up to the boiling point. While a single two-stage treatment as just described will in some instances be sufficient, I generally find that improved results are obtained by repeating these steps. The catalyst can then be placed back into service and will be found to have had its activity increased. In the absence of exceptional circumstances, a treatment of the nature described will not be required much oftener than about once a year. This treatment however accomplishes a restoration in catalyst activity which cannot be effected by the conventional and relatively frequent pickling in acid alone. Inasmuch as the platinum gauzes, when they have undergone permanent loss in activity to an extent that they must be replaced in a converter with new catalyst, must be returned to the catalyst manufacturer for complete reworking, it will be readily apparent that my simple and inexpensive treatment is of great economic advantage. While a credit is obtained for used catalyst so returned, the additional cost of newly made catalyst of the same weight is much greater than the credit.

I prefer to employ hydrogen as the reducing gas in the practice of my invention. A convenient hydrogen-containing gas which is often available at the site of a nitric acid plant is the ammonia synthesis gas containing only hydrogen and nitrogen and which is converted to ammonia by the well known high pressure catalytic reaction, which ammonia is then converted by oxidation to nitric acid. A typical plant ammonia synthesis gas contains about 75 per cent hydrogen. Alternatively, I can use as the reducing gas carbon monoxide, ammonia, or mixtures of carbon monoxide and/or ammonia with hydrogen-containing gases. Broadly speaking, any reducing gas can be used, but care must be taken that the combination of treatment conditions with a particular gas is not such as to cause undesirable embrittlement of the platinum catalyst.

The catalyst after treatment with a reducing gas is cooled from the high temperature and then treated with an aqueous acid. While quite concentrated solutions of acid can be used, I generally prefer to use comparatively dilute acids in that the hydrogen ion activity is greater in dilute acids. A very suitable acid to employ is commercial concentrated hydrochloric acid of reagent grade. If desired this can be diluted down to as low as 1 normal, and even lower acid concentration can be used. While hydrochloric acid is preferred, I can use with good results the other mineral acids, e. g. nitric acid, sulfuric acid, phosphoric acid, and/or organic acids e. g. formic acid.

In practice I have found that a treatment with plant synthesis gas containing about 75 percent hydrogen for two hours at 850–900° C., followed by cooling and treatment with boiling concentrated hydrochloric acid for one hour, followed by washing with distilled water, followed by a single repetition of the treatments just mentioned, gives an acceptable restoration of catalyst activity. The longer the treatment with reducing gas, the higher the temperature with reducing gas limited however to avoid embrittlement of the catalyst, and the longer the treatment with acid, the more effective is the restoration of catalyst activity. However, in general for a given time of total treatment more effective results are obtained by multiple treatments i. e. by one or more repetitions of the entire series of reducing gas-acid treatment.

In choosing the temperature for treatment with reducing gas, it is important that this treatment be carried out at relatively high temperatures. The range of 850 to 900° C. is preferred with the ordinary platinum-rhodium gauze catalyst used in ammonia oxidation. Higher temperatures tend to cause excessive embrittlement and lower temperatures tend to slow down the reaction. For instance, at 700° C. much longer time is required to effect the same degree of restoration of activity as required at 850–900° C. Even though some effect was obtained at temperatures as low as 350° C., this can be considered to be about the lowest operable limit. I prefer that the temperature be at least 750° C. Operation is seldom carried out at temperatures above 950° C. because of increasing embrittlement and volatilization of catalyst components.

The second stage in the two step treatment, viz. treatment with aqueous acid, is conveniently done at ordinary room temperature, i. e. about 20° C. However a temperature of 100° C. and even 200° C. is satisfactory in a closed apparatus. A fast action of the acid is obtained by treating the catalyst at atmospheric pressure with boiling aqueous acid.

Figure 2:
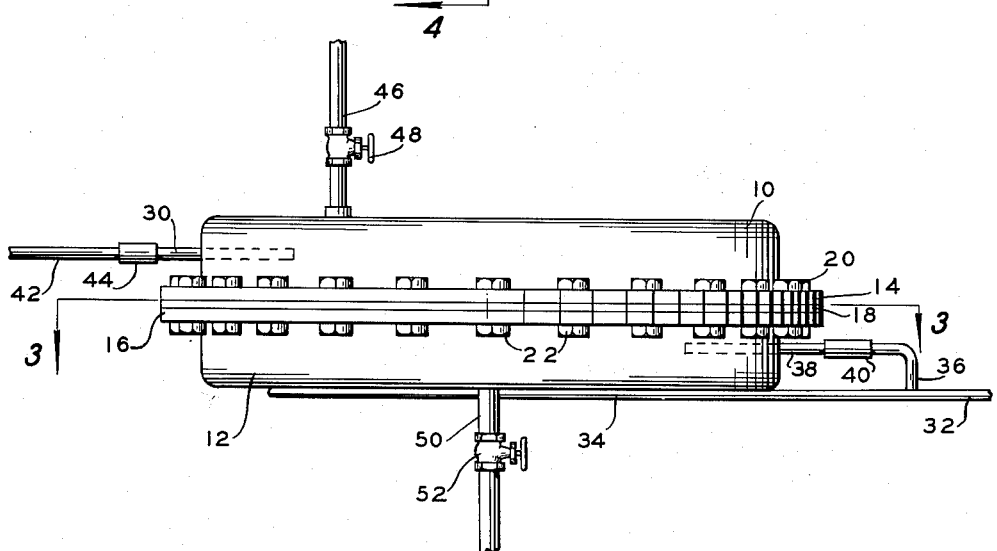
Figure 3:
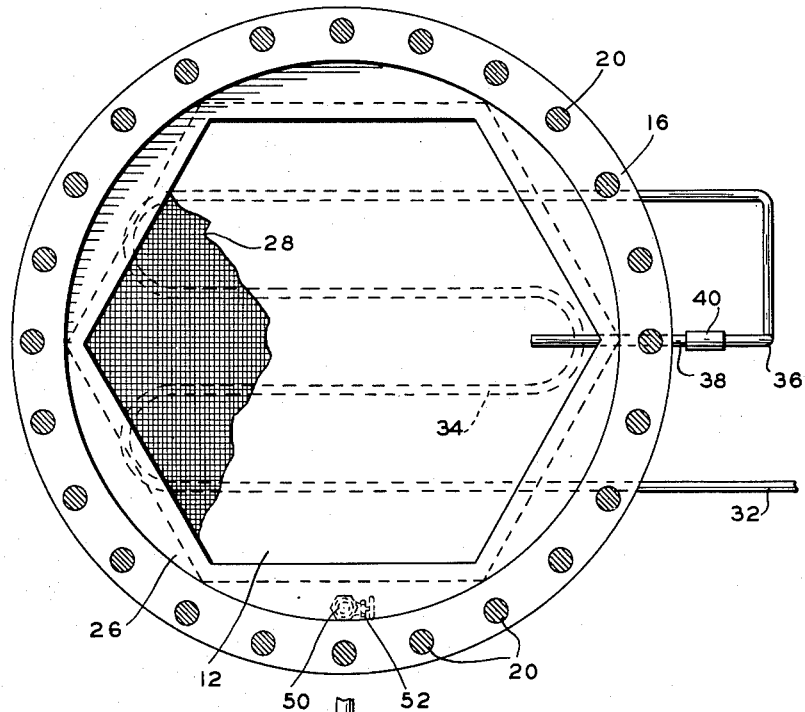
Figure 4:
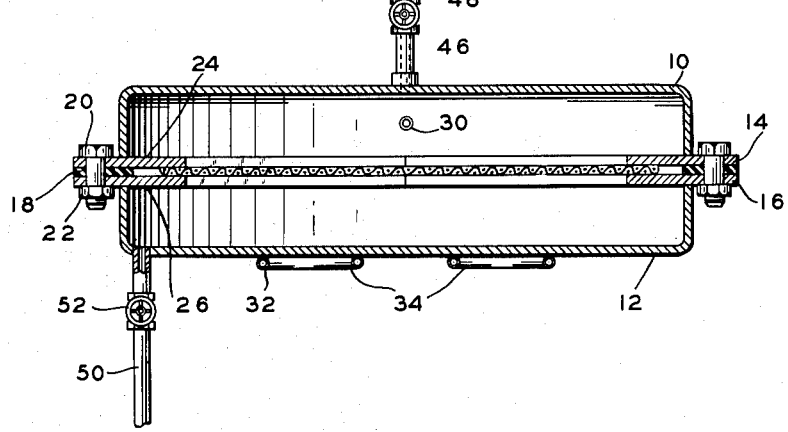

The accompanying drawings show in diagrammatic form one preferred form of apparatus suitable for carrying out my treatment of catalyst. It will be appreciated however that the treatment can be effected in other forms of apparatus which will occur to those skilled in the art, having been given the present disclosure. In the drawings, Figure 1 is a plan view and Figure 2 is an elevation view of the apparatus. Figure 3 is a cross-sectional view taken horizontally through Figure 2 as indicated along the line 3—3. Figure 4 is a vertical cross-section taken through Figure 1 on a plane indicated by the line 4—4. In the various figures, like numerals will be used to designate like elements wherever possible.

In the drawings, an upper chamber 10 and a lower chamber 12 are fastened together to make a closed vessel by means of their relative flanges 14 and 16. A circular gasket 18 is placed between the two flanges, which are fastened together by a series of bolts 20 and nuts 22. Each of the upper and lower chambers 10 and 12 carries an internal horizontal flange, designated by numbers 24 and 26 respectively, which is welded to the outer cylindrical edge of the chamber and extends inwardly therefrom and is hexagonally shaped internally. As shown in the drawings, a single integral flange forms both the external and internal flange for each chamber, thus simplifying the construction. In order to purify one or more catalyst gauzes, the gauze or gauzes 28 which are hexagonal, are placed in position resting on the lower internal flange 26. The annular gasket 18 is then put in position, and the upper chamber 10 is placed so that the gauze rests between the lower internal flange 26 and the upper internal flange 24. This need not be a tight fit, but some pressure can be applied if desired remembering, however, that the gauze should not be subjected to much pressure lest it be damaged. The upper and lower chambers 10 and 12 are then fastened together with the bolts 20 and nuts 22, the gasket 18 taking most of the pressure, and making the entire apparatus gas-tight. In the horizontal cross-sectional view of Figure 3, a portion of the gauze 28 has been shown, but the balance has been cut away for a more ready showing of the remainder of the apparatus which lies below the gauze.

The first step of the purification is accomplished by passing the reducing gas, e. g. hydrogen into the lower chamber 12 up through the gauze 28 into chamber 10, and out of chamber 10 throughout line 30, while the entire apparatus is heated by means not shown. This particular form of the apparatus is advantageously heated by a flame beneath the apparatus. However, it can be placed in an electrically heated furnace or any other suitable means of heating can be employed. The heat is controlled by means of a thermocouple, not shown, placed in chamber 10 near the upper surface of catalyst 28. The control can be either mechanical or automatic by means obvious to those skilled in the art. Hydrogen or other reducing gas is introduced through line 32 and passes through coil 34 which can be attached to the bottom of lower chamber 12 by tack welding or any other suitable means, but which preferably is detachable therefrom, whereby the reducing gas is preheated before entering the apparatus proper. The thus heated gas then passes via lines 36 and 38 into lower chamber 12 for flow through the gauze 28 as hereinbefore described. After the desired volume of gas has been passed continuously through the apparatus for the desired time, the flow of gas is stopped, the apparatus is cooled, and the acid treatment is then begun. Conveniently, the gas preheating coil 34 is detachably connected by coupling 40 to inlet pipe 38, and similarly outlet pipe 30 is detachably connected to an effluent line 42 by means of coupling 44. Thus the apparatus can be disconnected at these couplings from the attached tubing, and sealed at the said couplings by valves or clamps or other means not shown to make the apparatus liquid-tight in preparation for the acid treatment.

The desired aqueous acid is now introduced into the apparatus through acid inlet 46 containing valve 48. The thus introduced acid can be caused to flow continuously through the apparatus, including gauze 28, and thence through the outlet pipe 50 carrying valve 52. Alternatively, the acid can be introduced through pipe 50 and valve 52 up into the apparatus, bleeding gases out through valve 48 and pipe 46, until a desired level of liquid aqueous acid is attained in upper chamber 10. At this point valve 52 can be closed while valve 48 is left open for escape of vapors. The acid can then be allowed to stand for as long as desired for the acid treatment. Also, the apparatus can be heated to the atmospheric boiling point of the acid if desired, and even to higher temperatures by applying a back pressure through partial closure of valve 48. In the latter case, of course, care is taken to avoid dangerous build-up of pressure in the apparatus. At the desired time of acid treatment, the acid is drained out, and the entire interior of the apparatus including the gauze, is flushed with distilled water. The sequence of steps, involving high temperature treatment with reducing gas followed by treatment with aqueous acid can be repeated. If this is not deemed necessary, the apparatus is disassembled and the gauze is returned to use in the reaction chamber, e. g. in the converter in an ammonia oxidation plant.

In one such ammonia oxidation plant, in which this invention has been successfully carried out, each converter contains, stacked one above the other, sixteen individual units, each unit in turn being made up of three individual gauzes. About 120 ounces of gauze containing 90 per cent platinum, 5 per cent rhodium and 5 per cent palladium is used in each converter. The sheets of gauze are hexagonally shaped, and are about 16 inches across from one flat side to the opposite side. When gauze from a given converter is to be treated in accordance with my invention, ordinarily the entire 16 units of gauze are removed from the converter, and replaced by gauzes which are new or which have been treated and made ready for service. This permits the converters to be put back on-stream promptly. Any of the removed gauze that has been damaged is peeled off and scrapped, which involves returning to the gauge manufacturer for reprocessing. The entire remaining gauze can then be given the treatment of the present invention, after which it is either placed in reserve for future use or put back into a converter for immediate use as required. In either case, the treated gauze is made up to correct weight with new gauze. Alternatively, only some of the units of gauze can be removed at any given time from a given converter for treatment in accordance with my invention, and the converter continued on-stream with the remaining gauze or with the remaining gauze plus replacement for the gauze removed for treatment.

Although the invention has been described with particular reference to specific preferred materials and procedures and apparatus, it will be understood that various modifications thereof can be made without departing from the invention.

I claim:

1. A method for improving the activity of a catalyst consisting essentially of at least one platinum group metal which has undergone loss in activity during use by contamination with iron-containing material which comprises subjecting same to the action of a reducing gas at a temperature of at least 350° C. and below the temperature at which said catalyst becomes embrittled, subjecting same to the action of an aqueous acid selected from the group consisting of hydrochloric acid, nitric acid, sulfuric acid, phosphoric acid and formic acid and removing said acid from said catalyst.

2. A method for improving the activity of a platinum group metal catalyst which has undergone loss in activity by contamination with iron-containing material during use in catalyzing a high temperature oxidation, which comprises contacting same with a reducing gas for at least one hour at a temperature of at least 750° C. and below the temperature at which said catalyst becomes embrittled, contacting same with an aqueous strong mineral acid and removing said acid from said catalyst.

3. A method according to claim 2 wherein the sequence of steps of contacting with reducing gas, contacting with aqueous acid and removing said acid from said catalyst is repeated at least once.

4. A method for improving the activity of a platinum group metal catalyst which has undergone loss in activity by contamination with iron-containing material not readily removable by simple acid pickling during use in catalyzing a high temperature oxidation, which comprises contacting same with a reducing gas selected from the group consisting of hydrogen, ammonia, and carbon monoxide for at least one hour at a temperature of at least 750° C. and below the temperature at which said catalyst becomes embrittled, contacting same with an aqueous strong mineral acid and removing said acid from said catalyst.

5. A method according to claim 4 wherein said reducing gas is hydrogen.

6. A method according to claim 4 wherein said catalyst is a platinum-rhodium gauze.

7. A method for purifying a gauze catalyst consisting essentially of at least one platinum group metal which has been contaminated, during use in catalyzing the oxidation of ammonia to nitrogen oxides, with iron-containing material not readily removable by simple acid pickling, which comprises contacting such a catalyst with a reducing gas selected from the group consisting of hydrogen, ammonia, and carbon monoxide for at least one hour at a temperature of 850 to 900° C., then cooling same, contacting same with an aqueous strong mineral acid selected from the group consisting of hydrochloric acid and nitric acid and removing said acid from said catalyst by washing with water and drying said catalyst.

8. A method according to claim 7 wherein said catalyst is platinum-rhodium gauze, said reducing gas is hydrogen, and said aqueous acid is concentrated hydrochloric acid.

9. A method according to claim 8 wherein said platinum-rhodium gauze is an alloy containing largely platinum plus small amounts of rhodium and palladium.

10. A method according to claim 8 wherein said contacting with acid is effected at the boiling point of the aqueous acid.

11. A method according to claim 7 wherein said aqueous acid is at least 1 normal.

References Cited in the file of this patent

UNITED STATES PATENTS

| | | |
|---|---|---|
| 1,270,989 | Taliani | July 2, 1918 |
| 2,006,221 | Ridler | June 25, 1935 |
| 2,027,855 | Brown | Jan. 14, 1936 |
| 2,344,208 | Kirkpatrick | Mar. 14, 1944 |
| 2,369,956 | Feisst et al. | Feb. 20, 1945 |
| 2,584,080 | Houpt | Jan. 29, 1952 |